United States Patent [19]

Yoshimura et al.

[11] Patent Number: 4,701,496

[45] Date of Patent: Oct. 20, 1987

[54] COMPOSITION FOR DRAWN FILM, COLD DRAWN FILM MADE OF SAID COMPOSITION AND PROCESS FOR MANUFACTURE OF SAID FILM

[75] Inventors: Isao Yoshimura; Hideo Hata; Takashi Kaneko, all of Kawasaki, Japan

[73] Assignee: Asahi-Dow Ltd., Tokyo, Japan

[21] Appl. No.: 825,774

[22] Filed: Feb. 3, 1986

Related U.S. Application Data

[60] Continuation of Ser. No. 670,678, Nov. 13, 1984, abandoned, which is a continuation of Ser. No. 457,362, Jan. 12, 1983, abandoned, which is a division of Ser. No. 213,461, Dec. 5, 1980, Pat. No. 4,499,241, which is a division of Ser. No. 949,253, Oct. 6, 1978, abandoned.

[30] Foreign Application Priority Data

| | | |
|---|---|---|
| Oct. 11, 1977 [JP] | Japan | 52-120917 |
| Nov. 22, 1977 [JP] | Japan | 52-139431 |
| May 30, 1978 [JP] | Japan | 53-63870 |
| May 30, 1978 [JP] | Japan | 53-63872 |

[51] Int. Cl.$^4$ .................... C08L 23/06; C08L 23/12; C08L 23/16; C08L 23/20
[52] U.S. Cl. .................... 525/240; 525/211
[58] Field of Search ............ 525/240, 211

[56] References Cited

U.S. PATENT DOCUMENTS

| | | | |
|---|---|---|---|
| 3,256,366 | 6/1966 | Corbelli | 525/240 |
| 3,256,367 | 6/1966 | Jayne | 525/240 |
| 3,517,086 | 6/1970 | Shirayama et al. | 525/240 |
| 3,562,790 | 2/1971 | Coover et al. | 525/240 |
| 3,758,643 | 9/1973 | Fischer | 525/240 |
| 3,806,558 | 4/1974 | Fischer | 525/240 |
| 3,846,349 | 11/1974 | Harada et al. | 525/240 |
| 3,998,911 | 12/1976 | Strametz et al. | 525/240 |
| 4,087,485 | 5/1978 | Huff | 525/240 |
| 4,088,714 | 5/1978 | Huff | 525/240 |
| 4,113,804 | 9/1978 | Cotten et al. | 525/211 |

FOREIGN PATENT DOCUMENTS

| | | | |
|---|---|---|---|
| 1037819 | 8/1966 | United Kingdom | 525/240 |
| 1114589 | 5/1968 | United Kingdom | |

Primary Examiner—Carman J. Seccuro
Attorney, Agent, or Firm—Cushman, Darby & Cushman

[57] ABSTRACT

A composition for shrinkable film which excels in heat-sealability, transparency, strength, and particularly low-temperature quick shrinking property and, therefore, suits production chiefly of packaging materials, a film made of the composition and a process for the manufacture of the film are disclosed. Specifically, the composition comprises one of the specific combinations of components (A), (B) and (C), i.e. the combinations of (A)+(B), (B)+(C) and (A)+(B)+(C), wherein (A) is non-rigid polyolefine resins such as ethylene vinyl acetate, (B) is an elastomer comprising a specific ethylene-α-olefin copolymer, and (C) is rigid polyolefin resins such as polypropylene. The packaging film excelling particularly in optical property, mechanical strength and low-temperature shrinking property is obtained by converting a homogeneous blend of the aforementioned composition, either in its crosslinked form or in its non-crosslinked form, into a tubular raw film, which is stretched at a temperature low enough for imparting a high orientation to the film. The process for the manufacture of this packaging film is also disclosed.

8 Claims, 5 Drawing Figures

COMPOSITION FOR DRAWN FILM, COLD DRAWN FILM MADE OF SAID COMPOSITION AND PROCESS FOR MANUFACTURE OF SAID FILM

This is a continuation of application Ser. No. 670,678, filed Nov. 13, 1984, which was abandoned upon the filing hereof, which in turn is a con. of Ser. No. 457,362 filed 1/12/83, now abandoned; which in turn is a div. of Ser. No. 213,461 filed 12/5/80 now U.S. Pat. No. 4,499,241; which in turn is a div. of Ser. No. 949,253 filed 10/6/78, now abandoned.

BACKGROUND OF THE INVENTION

Packages formed with films are manufactured by a good number of methods which utilize to advantage the characteristics of the films such as the bag sealing method, twist wrapping method, thermal shrink wrapping method, cohesive wrapping method by use of specific films represented by Saran Wrap (product by Asahi-Dow Limited), stretch wrapping method and the like. These methods require respective wrapping characteristics. For each packaging method, therefore, it is important to select a film whose basic material, composition, form and characteristic attributes best suit the wrapping characteristics of the particular method employed.

Of these packaging methods, this invention primarily aims to provide a film particularly suitable for the shrink wrapping method. Nevertheless the film of the present invention need not limit its uses but may be put to other uses satisfactorily. Thus, this is a unique multi-purpose film never attained to date. For the convenience of illustration, therefore, the present invention will be hereinafter described with reference to the film formulated to suit the shrink wrapping method.

Generally, the shrink wrapping method effects required wrapping by virtue of the thermal shrinkability of a film stretched and oriented in fixed directions, specifically resorting to a procedure of loosely prepackaging a given commodity with the film as by sealing, and thereafter thermally shrinking the film as enclosing the commodity therein by means of a suitable heat medium such as the hot air, infrared ray or hot water for thereby causing the film to shrink and come into skintight contact with the overall irregular contour of the commodity. This method is characterized by providing a package which has a beautiful appearance, imparts an enhanced commercial value to the content, keeps the content in a hygienic condition and yet permits the content to be examined for its quality through visual observation or by sensation of touch. This method enables even a commodity of irregular shape or a plurality of commodities to be packaged with ample tightness in a single piece and provides the content with effective protection against vibrations and other impacts.

Further, the shrink wrapping method provides speedy packaging as compared with the stretch wrapping method which is extensively used such as in super markets. As an effective method for industrial packaging of heavy articles of large dimensions which the stretch wrapping method is incapable of packaging, this shrink wrapping method is finding rapidly increasing acceptance and arresting keen attention.

Moreover, it permits packaging of commodities of shapes so irregular as to defy effective packaging by the stretching method and enables desired packaging to be accomplished without use of trays or other containers. It also enjoys greater tightness of package. In spite of all these advantages, the shrink wrapping method has a disadvantage that the package must be amply heated until the film shrinks to required tightness.

It is the oriented film of plasticized polyvinyl chloride (hereinafter referred to as PVC) that is now used most widely for the shrink wrapping. This is ascribable to the film's great merit of readily undergoing thermal shrinkage of a high rate at relatively low temperatures and providing satisfactory shrink wrapping in a wide range of temperatures. On the other hand, this film nevertheless has a disadvantage that it provides heat sealability, preservability (liability of the plasticizer to degrade properties brought about by the orientation of film) and moistureproofness less than normally required, entails a hygienic hazard due to use of the plasticizer, emits noxious gases such as chlorine-based gases when the film is cut by means of heated wire, issues corrosive gases when the film, after use, is burnt in an incinerator and, because of its inferior cold resistance, tends to rigidify, embrittle and rupture when the packages using the film are stored at low temperatures or handled in cold districts.

In recent years, therefore, increasing attention has come to be focussed on a polypropylene type (hereinafter referred to as PP) film for use in the shrink wrapping method. The PP film has a disadvantage that it provides inferior shrinkability to the PVC film. The oriented film of the PP type is excellent in mechanical property, moistureproofness, heat seal strength, heat resistance and film modulus and, therefore, proves to be highly suitable for use as a film for the shrink wrapping.

Further, PP is advantageous over PVC in terms of raw material cost and because of low specific gravity. Because PP is a rigid, crystalline polymer possessing a high softening point, the PP film requires heating at a higher temperature for necessary shrinkage than the conventional oriented films and exhibits a very slight degree of shrinkage at low temperatures in the neighborhood of 100° C. Thus, the PP film most be heated at high temperatures in the course of the shrink wrapping. Moreover since the allowable range of temperatures for the heating is narrow and the dependency of the rate of shrinkage upon temperature is heavy, a locally uneven heating possibly given to the film at the time of wrapping results in a notable uneven shrinkage which tends to cause creases, dots resembling pockmarks and other surface irregularities which are undesirable from the viewpoint of practical use of film. More heating given to the film for the purpose of preventing such uneven shrinkage brings about a serious drawback that the content being packaged is exceessively heated, the film is deprived of its transparency, and the film is ruptured along the sealed portion and around the air vents. Generally, the PP film is available preponderantly in small thickness. If the thickness is increased, the PP film becomes too rigid to permit successful shrink wrapping and tends to sustain rupture readily.

The conventional low-density polyethylene (hereinafter referred to as LDPE) film in its unaltered form does not permit sufficient orientation of molecules. The oriented LDPE film resulting from the treatment of stretching, therefore, exhibits low thermal shrinkage and particularly low thermal shrink tension, requires high temperature for shrinkage, offers poor film strength and optical property, produces low binding force in the package with respect to the article contained. Because of these inferior properties, the LDPE film which is produced in an increased thickness is put to special uses.

In the case of LDPE film, if the film is stretched thoroughly at a high temperature exceeding its melting point by use of a high-energy ray so as to cause crosslinking of molecules, the oriented film enjoys high processibility, permits required orientation to be set effectively in a range of high temperatures, exhibits high thermal shrinkage and high thermal shrink tension and excels the LDPE film in various properties such as optical properties including transparency and gloss, resistance to heat and the like. In the range of high temperatures, however, the thermal shrinkage is not high enough to permit effective heat sealing and the film strength is degraded to impair the heat sealability and tear resistance.

Further, the oriented LDPE film has a disadvantage that the cutting and the sealing of film by means of a heating wire are difficult to effect, the physical properties, particularly the optical properties are degraded subsequently to the thermal shrinkage, the film strength is lowered, and the film tends to sustain rupture and creases around air vents at the time of shrink wrapping. Because of these drawbacks, the shrink wrapping by use of the oriented LDPE film is inferior in terms of speediness of operation and finish.

As is clear from the foregoing description, one important requirement for successful shrink wrapping resides in the fact that the film should permit required packaging to be effectively carried out at low temperatures. This requirement is particularly significant when the packaging is given to fresh food.

The oriented PP film is produced by a procedure of extruding the molten polymer through an annular die into a tubular raw film, suddenly cooling the extruded tubular raw film, again heating the raw film at high temperatures in the range of from 150° to 160° C. and simultaneously introducing air into the interior of tubular raw film. The oriented LDPE film can be produced by the conventional procedure which is employed in biaxially stretching. These processes are extremely difficult to accomplish from the technical point of view because the films are highly liable to sustain rupture.

Thus, the direct inflation method which involves a procedure of extruding the molten polymer at a temperature in the range of from 180° to 220° C., for example, and thereafter suitably cooling the extruded tubular film with ambient air and, at the same time, inflating the film to a film of a desired size is generally employed.

The inflation method is characterized by being capable of producing a desired film readily and inexpensively. It nevertheless suffers from a disadvantage that the treatment entails irregular flow and crystallization of molecules and impairs the optical properties of film and the stretching fails to provide satisfactory setting of molecular orientation. Consequently, the thermal shrinkage and thermal shrink tension are deficient and high temperatures are required for ensuring their sufficiency. The film produced by this method, therefore, in impracticable unless it is produced in an increased and put to special uses. To overcome the disadvantage, there have been developed improved methods resorting invariably to a procedure of extruding LDPE in the form of a tubular film, exposing the film to a high-energy radiant ray under suitable conditions for thereby inducing a partial crosslinking reaction in the film and reheating and strethcing the film so as to effect required setting of molecular arrangement sufficiently without entailing random intermolecular flow. The conventional inflation method, however, produces a film which is not free from the aforementioned drawbacks.

A good many methods have heretofore been suggested for producing films by mixing polymers of different olefins or mixing polyolefins with other polymers and subsequently inflating the resultant blends. For example, U.S. Pat. No. 3,682,767 discloses a method for producing a film possessing improved melt strength and heat sealability and exhibiting improved make-and-fill property at the time of packaging a liquid commodity by a procedure of mixing ethylene, an olefin type unsaturated monomer such as, for example, ethylene-vinyl acetate copolymer (hereinafter referred to as EVA) and a linear copolymer of ethylene with an α-olefin having a density in the range of from 0.93 to 0.96 g/cm$^3$, such as, for example, a modified high-density polyethylene (hereinafter referred to as HDPE) and subsequently extruding the resultant blend in the form of a flat or tubular sheet. British Pat. No. 988,299 teaches a process for producing a printable polyethylene film by a procedure of mixing EVA with LDPE or HDPE, causing crosslinking in the resultant blend either before or after molding, and subsequently stretching the blend in the form of film. And British Pat. No. 1,035,887 concerns a process for the production of a film excelling in low-temperature properties by a procedure of mixing LDPE with a linear medium-density polyethylene obtained by modifying ethylene with a small amount of butene and stretching the resultant blend.

As to manufacture of films, British Pat. No. 998,299 mentioned above involves a procedure of treating the aforementioned composition with a peroxide or a high-energy ray and thereby causing crosslinking and subsequently stretching the crosslinked sheet at temperatures close to or slightly higher than the melting point of polyethylene and British Pat. No. 992,897 adopts a procedure of treating EVA with a highenergy ray and thereby causing crosslinking and subsequently stretching the crosslinked sheet at elevated temperatures (preferably in the range of from 100° to 120° C., for example). The films obtained of such compositions are devoid of the excellent optical properties, strength properties and low-temperature shrinking property enjoyed by the aforementioned PVC type films and they fail to exhibit satisfactory film-forming property.

SUMMARY OF THE INVENTION

The inventors carried out a study with a view to improving these films and their manufacturing methods and thereby eliminating their inherent drawbacks. They have, consequently, developed a composition as the raw materials for the film which far excels in thermal shrinkage properties, particularly thermal shrinkage and thermal shrink tension at low temperatures and broadness of temperature range for thermal shrinkage upon temperature, optical properties, film sealing property and film strength and which, therefore, excels both plasticized PVC film and PP film and combines the characteristics of both the films, and a film formed of said composition and a process for the manufacture of the film which enjoys an outstanding workability.

Figure 1:
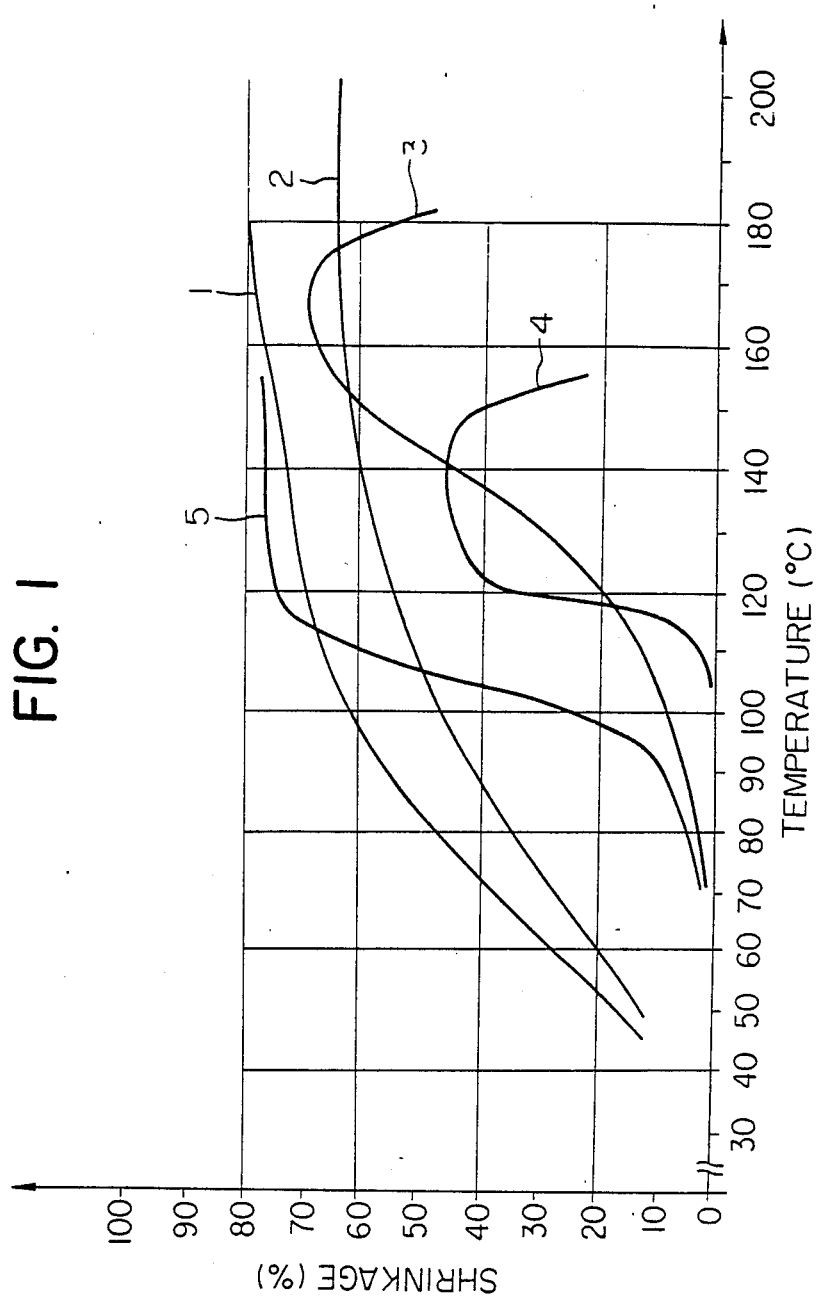
FIG. 1 is a graph which shows the relation between the shrinkage of film and the heat-treating temperature.

In the figure, curve 1 indicates the film of Run No. 2 Example 1. Curve 2 indicates the film ($17\mu$ in thickness) of the commercial plasticized PVC shrink film. Curve 3 indicates the commercial PP shrink film ($16\mu$ in thickness). Curve 4 indicates the commercial uncrosslinked low density polyethylene shrink film ($50\mu$ in thickness). Curve 5 indicates the commercial crosslinked polyethylene shrink film ($17\mu$ in thickness).

DETAILED DESCRIPTION OF THE INVENTION

To be specific, the present invention relates to a composition which comprises one of the combinations of components (A), (B) and (C), namely the combinations of (A)+(B), (B)+(C), and (A)+(B)+(C), wherein (A) is at least one selected from the group consisting of LDPE and copolymers of ethylene with vinyl ester monomers, unsaturated aliphatic monocarboxylic acids and alkyl esters of said monocarboxylic acids which are all copolymerizable with ethylene, (B) is an elastomer comprising a specific ethylene-α-olefin copolymer, and (C) is at least one selected from the group consisting of crystalline PP, HDPE and crystalline polybutene-1 (hereinafter referred to as PB-1), to a film manufactured by thoroughly melting and blending said composition, extruding the resultant homogeneous blend through an annular die, suddenly cooling the tubular sheet with a liquid refrigerant, causing the resultant solidified sheet, either immediately thereafter or subsequently to a treatment with a high-energy ray or incorporation of a peroxide aimed at inducing crosslinking in the sheet during the subsequent application of heat, to be heated to temperatures not exceeding 110° C., then cold stretching the heated sheet into a film at an area stretching ratio of from 5 to 30 times the original dimension at a stretching temperature in the range of from room temperature (20° C.) to 100° C., and further to a process for the manufacture of said film. The film thus produced from the composition of this invention by the process also of this invention is characterized by possessing outstanding low-temperature shrinkability, film strength, optical properties and other characteristics which have never been attained to date.

The polymer (A) to be used in the present invention is selected from the group consisting of LDPE and copolymers of ethylene with vinyl ester monomers, unsaturated aliphatic monocarboxylic acids and alkyl esters of said monocarboxylic acids. LDPE possesses a density of not more than 0.935 g/cm$^3$, preferably not more than 0.925 g/cm$^3$, and a melt index [determined in accordance with ASTM D-1238 (190° C.)] of from 0.2 to 10, preferably from 0.1 to 5. Examples of the copolymers satisfying the requirement include EVA, ethylene-acrylic acid copolymer, ethylene-methacrylic acid copolymer, ethylene-ethyl acrylate copolymer, ethylene-methyl methacrylate copolymer, and the like. In any of these copolymers, the amount of a monomer contained besides ethylene is desired to be in the range of from 3 to 30% by weight, preferably from 3 to 25% by weight. If the amount of the monomer is less than 3% by weight, the cold stretchability is somewhat inferior when the stretching is carried out on the film in its uncrosslinked form. Besides, the film's strength, thermal shrinkability and sealing property are not sufficient. If the amount exceeds 30% by weight, the tubular sheet has inferior processibility and the opposed surfaces of film undergo the phenomenon of mutual blocking to render the film handling difficult, and the mixing property of the components to make up the composition, the strength of film and the optical properties, etc. are impaired. As described above, the melt index of the polymer is in the range of from 0.2 to 10, preferably from 0.3 to 5. If the melt index is less than 0.2, the mixing property of the components of the composition and the extrudability of the resulting blend are not satisfactory. If the melt index exceeds 10, the blend fails to provide sufficient strength and the extruded sheet tends to sustain rupture readily at the time of stretching. These drawbacks are suffered also when the sheet is subjected to the treatment for crosslinking.

Of the various possible copolymers usable as the component (A) in the composition of this invention, most desirable is ethylene-vinyl acetate copolymer. In the case of a low-density polyethylene, the blend is desired to be subjected to said treatment for crosslinking.

The thermoplastic elastomer comprising a copolymer of ethylene with at least one α-olefin as the component (B) is a non-rigid copolymer of ethylene with at least one α-olefin selected from the group consisting of α-olefins having from 3 to 12 carbon atoms. As occasion demands, this elastomer may be further copolymerized with a small amount of a hydrocarbon of the polyene structure such as, for example, 1,4-hexadiene, ethylidene, norbornene, etc. Examples of the α-olefin suitable for this purpose include propylene, butene-1, hexene-1, heptene-1, 4-methyl- 1-pentene, octene-1, etc. Of these α-olefins, preferable are propylene and butene 1. In any of these copolymers, the ethylene content is desired to fall in the range of from 20 to 90 mol %, more desirably from 40 to 90 mol %, preferably from 65 to 88 mol %.

These copolymers are of such nature that the density is not more than 0.91 g/cm$^3$, the Vicat softening point [as determined in accordance with ASTM D-1525 (value under 1 kg of load)] is not more than 80° C., preferably not more than 70° C. and the crystallinity in the rubbery zone generally ranges from substantial amorphousness to low partial crystallinity of the order of not more than 30% of crystallinity degree determined with X-ray.

The component (B) is particularly desired to be a copolymer of ethylene with propylene or butene-1, and this copolymer may, when necessary, incorporate therein a small amount of a compound of the diene structure in the form of a copolymer. It is, therefore, a thermoplastic elastomer in the form of a random copolymer obtained by the polymerization using a catalyst of the system produced with a vanadium compound and an organic aluminum compound. The elastomer possesses a melt index of from 0.1 to 10, preferably from 0.2 to 6.

The polymer (C) is at least one selected from the group consisting of crystalline PP, HDPE and high molecular PB-1 which each possess relatively high regidity and relatively high degree of crystallinity. The polymer has relatively high rigidity and desirably a Vicat softening point of not less than 100° C.

The crystalline PP which is one of the members of the group from which the component (C) of the composition of this invention is selected is a crystalline PP with high isotacticity usually available on the market. It is desired to be a homopolymer of propylene or any of the copolymers of propylene with not more than 10 mol % of ethylene, 1-butene or some other α-olefin. It may be a mixture of these copolymers.

HDPE as one member of said group is a polyethylene produced by the medium- or low-pressure process and possessing a density of not less than 0.935 (g/cm$^3$) which is usually available on the market. This polyethylene is desired to possess a melt index in the range of from 0.1 to 10, preferably from 0.2 to 7. In the case of a copolymer, the ethylene group content is desired to exceed 90 mol %, preferably to be about 95 mol %. When the high-density polyethylene is used as the component (C), the blend prepared for film is desired to undergo the aforementioned treatment for crosslinking. If the melt index is less than 0.1, the film made of the blend using such a component is impaired in the mixing property of components and optical properties. If the melt index is more than 10, the blend fails to offer sufficient strength and the sheet's stretchability is impaired. The polybutene-1 is desired to be a crystalline homopolymer or copolymer of more than 90 mol % of butene-1 with other monomer. Unlike a liquid to waxy low molecular polymer, these polymers are desired to possess a melt index in the range of from 0.2 to 10 for the same reason as mentioned above. Of the three possible members of the aforementioned group, it is desirable to use chiefly the crystalline polypropylene. A mixture of polypropylene with high-density polyethylene may be used.

The composition of the present invention comprises one of the specific combinations of components (A), (B) and (C), i.e. the combinations of (A)+(B), (B)+(C) and (A)+(B)+(C). The mixing ratio of these components is such as to satisfy:

$0.05 \leq B/(A+B) \leq 0.90$ in the first combination,
$0.30 \leq B/(C+B) \leq 0.90$ in the second combination, and
$0.05 \leq B/(A+B) \leq 0.90$ and $0.05 \leq C/(A+B) \leq 2.0$ in the third combination, and more desirably to satisfy:

$0.07 \leq B/(A+B) \leq 0.70$ in the first combination,
$0.40 \leq B/(C+B) \leq 0.87$ in the second combination, and
$0.07 \leq B/(A+B) \leq 0.70$ and $0.07 \leq C/(A+B) \leq 1.0$ in the third combination, and preferably to satisfy:

$0.10 \leq B/(A+B) \leq 0.50$ in the first combination,
$0.50 \leq B/(B+C) \leq 0.85$ in the second combination, and
$0.10 \leq B/(A+B) \leq 0.50$ and $0.10 \leq C/(A+B) \leq 1.0$ in the third combination.

If the amount of the non-rigid component (B) is less than the allowable lower limit indicated above, the blend of any of the first, second and third combinations fails to manifest the expected synergistic effect and, therefore, suffers from inferior processibility, lowered film strength and impaired optical properties and low-temperature shrinkability. If the amount is more than the allowable upper limit, the tubular sheet produced from the blend is degraded in film-forming property and stretchability and becomes so soft as to entail the phenomenon of film-to-film blocking and the produced film exhibits insufficient heat resistance, sealability, strength and optical properties.

Of the three possible combinations of components, particularly desirable is the third combination, i.e. the combination of (A)+(B)+(C). To be more specific, if the amount of the resin of the component (C) used in the composition is smaller than 5 parts by weight, the blend exhibits insufficient stretchability and the extruded sheet tends to sustain puncture and regain its original dimension and does not easily produce a film of uniform thickness possessing the outstanding properties mentioned above and tends to give inferior finish to the package. The film, when produced in a particularly small thickness, fails to provide sufficient modulus. Consequently, the film has poor dimensional stability and, therefore, tends to undergo deterioration by aging similarly to the plasticized PVC film, with the result that the heat resistance, heat seal strength, heat seal temperature range and finish of package are all adversely affected.

If the amount is greater than 200 parts by weight, the blend exhibits inferior stretchability and tends to sustain puncture and the film suffers from insufficient optical properties, uniformity of wall thickness and low-temperature shrinkability. The mixed component (C) serves to improve not only modulus but also seal properties such as, for example, thermal properties including heat resistance particularly in the higher portion of the allowable temperature range.

As described above, this invention permits the quenched tubular sheet which has been produced from the composition obtained by using the specific components in their respective specific amounts to be cold stretched with ample stability in the manner to be described hereinafter. If the tubular sheet is further treated with a specific high energy ray so as to have the gel content (insolubles in boiling xylene) or the melt index brought into a specific range, the components in the composition produce a synergistic effect such as to manifest the desired cold stretchability (at temperatures in the range of from 20° to 100° C.) under specific stretching conditions, giving rise to a film of outstanding properties.

Now, the composition produced by using the components in the preferred mixing ratio will be described. Generally, the crystalline PP [component (C)] is hardly crosslinked even when it is subjected to a treatment with a high-energy ray and it offers rather insufficient compatibility with EVA to be used as another component (A). In contrast, EVA when treated with a high-energy ray undergoes the reaction of crosslinking more easily than the ordinary low-density polyethylene. The elastomer of the copolymer of α-olefin (B) exhibits rather high compatibility with both polypropylene and EVA and induces the reaction of crosslinking as readily as EVA. Consequently, the synergistic effect brought about from the proper dispersion of the three components in the composition is coupled with the synergistic effect which issues from the action of the high-energy ray. The combination of these synergistic effects is believed to result in the production of a film wherein there is formed a specific, molecularly heterogeneous crosslinked matrix. The treatment with the high-energy ray, accordingly, improves notably the stable cold stretchability of the tubular sheet and the film's heat resistance and heat seal strength, enhances the thermal shrinkability and strength of the film at low temperatures, represses possible degradation in optical properties and physical properties after thermal shrinkage (such as optical properties, seal strength and mechanical strength) and expands the range of packaging temperatures. Thus, the properties possessed by the film which is produced from the crosslinked tubular sheet far excel those possessed by the plasticized PVC film and PP film which have heretofore been rated to be the best films.

The commercially available polyethylene film which has been thoroughly crosslinked by the treatment with a high-energy ray possesses the drawbacks mentioned above and, therefore, differs from the film of this invention. No matter whether the treatment for crosslinking is to be involved or not, the film made of the specific composition described above is required to possess a gel content of from 60 to 0% and a melt index of not more than 10, preferably a gel content of from 50 to 0% and a melt index of not more than 5. Particularly in the case of the film to be modified by the treatment with the high-energy ray, the insoluble gel content in boiling xylene is not more than 60% by weight and the melt index is not more than 1.0. Desirably, the gel content is not more than 50% by weight and the melt index is not more than 0.5. More desirably, the gel content is not more than 30% by weight and the melt index is not more than 0.2. Preferably, the gel content is not more than 20% by weight and the melt index is not more than 0.1. If the insoluble gel content is greater than the allowable upper limit mentioned above, the elongation of the stretched film is inferior and the heat sealability and the melt cutting and sealing of the film by the heating wire are inferior, the residual tension generated at the time of thermal shrinkage is high and the film tends to sustain rupture at the time of packaging. Further, the optical properties of the film are insufficient. If the melt index is greater than the allowable upper limit indicated above, the synergistic effects brought about by the treatment with the high-energy ray, namely the improvements in the processibility, the film's heat resistance, strength and heat sealability cannot be expected. Thus, the gel content and the melt index are desired to fall within the respective ranges indicated above.

In the present invention, the composition of this invention may be effectively used when it is mixed with some other composition insofar as the amount of the additive composition does not impair the stretchability and various other properties of the film.

The film of the present invention is characterized by the optical property [the value of Haze determined in accordance with ASTM D-1003-52] not exceeding 4.0%, more desirably 3.0% and preferably 2.0%. For example, the film of Run No. 2 of Example 1 is shown to possess a highly satisfactory value of Haze of 0.8%. This value is peculiar to the composition and the process of manufacture involved in this particular run of experiment. Because, the film can be processed without impairing the properties acquired in consequence of the quenching of the composition in the tubular sheet. Moreover the tubular sheet can stably be stretched in the form of bubbles at low temperatures below the melting point of the composition or preferably below the softening point of the composition. And, the synergistic effects originating in the composition itself preclude otherwise possible occurrence of structural defects such as voids and permit the tubular sheet to be stretched in conjunction with mixed components distributed in fine particles, giving rise to a film of flat surfaces involving no appreciable scattering of light. This possibly explains why the film has particularly high transparency.

The low-temperature shrinkability is one of the important properties which a given film is required to possess when the film is used for the purpose of shrink wrapping. When the film is tested for its thermal shrinkage at varying temperatures, the low temperature shrinkability is expressed by the value of the temperature which is required for the purpose of obtaining a specific shrinkage of 20% or 40% (to be expressed by an average shrinkage in the longitudinal and lateral directions). The lower the value of this temperature, the better the low-temperature shrinkability. Generally, the shrinkage which the film to be used for shrink wrapping is required to possess is not less than 20%, preferably not less than 40%. To be specific, the thermal shrinkage is obtained by a procedure of preparing a square test piece cut from a given film, inscribing a longitudinal and a lateral mark each of a specified dimension on the test piece, sprinkling the test piece with a powder such as of talc so as to repress its surface tackiness which often impedes convenience of handling, treating it with hot air of a prescribed temperature for five minutes for thereby causing the test piece to shrink, finding changes in the longitudinal and lateral dimensions of the marks and the found changes. The thermal shrinkage is expressed by the average of the longitudinal and lateral shrinkage. This thermal shrinkage is found at a varying temperature. The temperatures at which the film gives 20% and 40% of thermal shrinkage are reported as temperatures for shrinkages of 20% and 40% respectively.

In the case of the film of this invention to be used for shrink wrapping, the value of this temperature is small. As shown in FIG. 1 to be described afterward, the commercially available polypropylene film for shrink wrapping has 120° C. as the temperature of 20% of shrinkage and 134° C. as that of 40% of shrinkage as indicated by the curve 3, whereas the film of this invention has 53° C. as the temperature for 20% of shrinkage and 72° C. as that of 40% of shrinkage as indicated by the curve 1. The magnitude of low-temperature shrinkability in this invention is expressed by the temperature of 20% of shrinkage. It is desired to be not more than 85° C., desirably not more than 75° C. and preferably not more than 70° C. Although this value is affected secondarily by the stretching temperature and the composition, the fact that this value is on a low level constitutes one of the characteristics of the cold orientation of the present invention. If this value is large, required thermal shrinkage is not effected unless the film is exposed at a fairly high temperature for a long time at the time of its actual use. Consequently, the magnitude of heat generated by the heater must be increased and the speed of the packaging operation is lowered. Further, there is a possibility of the heat being transferred to the commodity being packaged. Such transfer of heat proves undesirable where the commodity being packaged is highly vulnerable to heat, degradable or deformable by the action of heat such as fiber or fresh food. In the case of a film whose curve of shrinkage rises sharply at high temperatures, the film's shrinkage is heavily varied even by a very slight change near the shrinkage temperature at the time of packaging. When the film is loosely wrapped around a commodity and the loose package is passed through a shrinkage tunnel, a slight shortage in the overall temperature of the hot air blown against the film results in insufficient shrinkage, so that the film fails to come into skintight contact with the contour of the commodity. If the temperature is slightly higher, the film is fused and sustains rupture or it is deprived of transparency and optical homogeneity.

If the value of this temperature is extreme, the film wound up in a roll undergo a dimensional change even at normal room temperature. The commercially available PVC plasticized film to be used for shrink wrapping has 58° C. for 20% of shrinkage and 88° C. for 40% of shrinkage as indicated by the curve 2 in the graph of FIG. 1. This suggests that this film possesses desirable low-temperature shrinkability, the shrinkage property varied smoothly with the temperature.

To date, no other commercially available film than the plasticized PVC film has had such desirable shrinkage property and strength.

Figure 2:
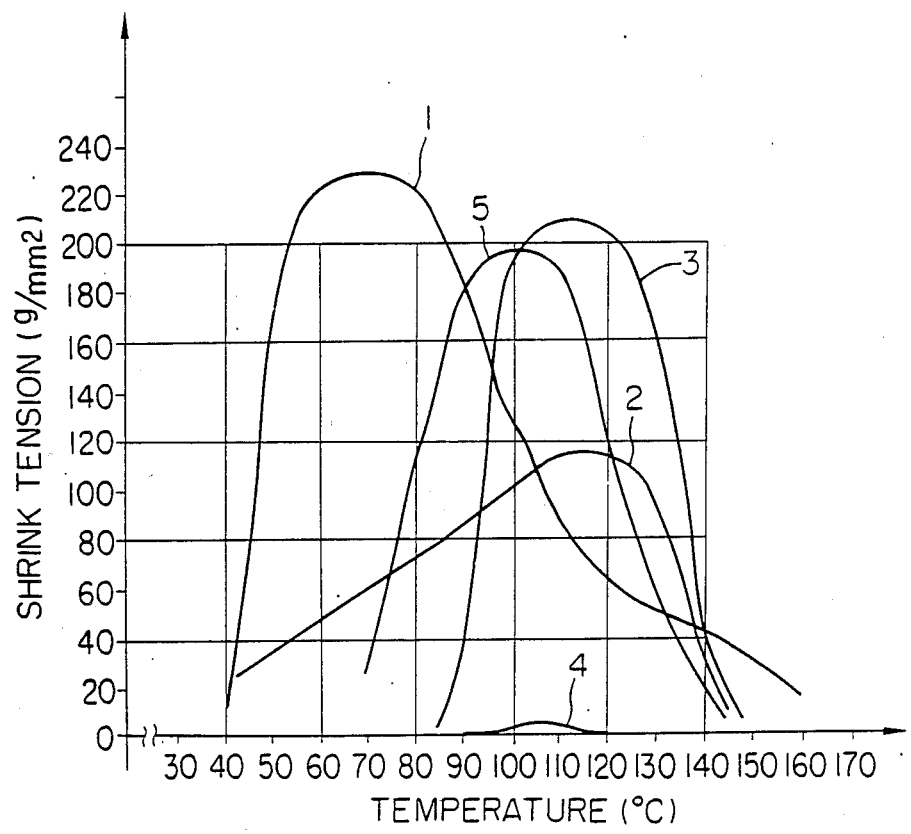
FIG. 2 is a graph which shows the relation between the shrink tension of the film and the heat-treating temperature.

The film of this invention has attained such excellent properties and, in this respect, defies all comparisons. The thermal shrink tension exhibited at the time of shrinkage constitutes one of the important thermal shrinkage properties, comparable with the thermal shrinkage which is an important factor when the film is used for the purpose of shrink wrapping. Even if the thermal shrinkage is high, the film fails to fit tightly to the commodity being packaged during or after the step of packaging when the tension generated in the film at the time of shrinkage is low or deviates in the direction of higher temperatures as will be described afterward. The film, then, fails to produce desired binding force and can no longer serve for the purpose of shrink wrapping. If the value of this tension is insufficient even to the slightest extent for the purpose of producing binding force, the film is required to have its thickness increased to make up for the insufficiency. Such increase in the film thickness is uneconomical and inconvenient. Generally, this maximum value is desired to be not less than 50 g/mm$^2$, preferably not less than 80 g/mm$^2$. As shown in FIG. 2, the commercially available polyethylene film for shrink wrapping has a thermal shrink tension of not more than 10 g/mm$^2$, about 5 g/mm$^2$ as indicated by the curve 4. Thus, the film is applicable to limited uses. The film of this invention has a value of 230 g/mm$^2$ as indicated by the curve 1 in the same graph. Generally, the film of this invention has a sufficiently high value in the range of from 100 to 400 g/mm$^2$.

In the case of the low-temperature shrinkable film, this shrink tension is not significant unless it is manifested at a temperature close to the temperature corresponding to the shrinkage. The temperature-dependency curve of the shrink tension must be well balanced with the shrinkage-temperature curve (expressed by the average of the values for longitudinal and lateral directions). At times, the thermal shrink tension is desired to occur in an increased range of temperatures. In this respect, the film of the present invention can be adjusted by properly selecting the composition and treatment.

In the present invention, the stiffness of the film can freely be adjusted in the range of from fair softness to considerable rigidity by varying the composition within the specified range.

The film of the present invention is further characterized by possessing a particularly high tensile strength. The strength at rupture is at least 5 kg/mm$^2$ (as determined in accordance with the method of ASTM D-882-67), preferably not less than 7 kg/mm$^2$. The elongation at rupture is desired to be not less than 50%, preferably not less than 100%, and more preferably not less than 150%. The dart impact strength is determined by following the method of ASTM D-1709-67 with necessary modifications. It is expressed by the value which is obtained by using a special dart whose missile head is provided with a grooved edge to facilitate rupture of the film. The film of this invention is also characterized by the fact that the dart impact strength has a particularly high value. For example, while the PVC film and the PP film have 18 and 12 kg.cm, the film in the Run No. 16 has a value of 48 kg.cm, the value comparable with that obtained by heavy bags of LDPE of 100 to 150$\mu$ in thickness available on the market. The dart impact strength is generally not less than 15 kg.cm, preferably not less than 20 kg.cm, and more preferably not less than 25 kg.cm (as expressed on the basis of 17$\mu$).

The fact that the tensile strength is high and the elongation is great as described above means that the film is tough and highly resistant to tear. Thus, the film proves highly advantageous for the protection of packages and permits a reduction in the film thickness.

The film of this invention possesses a strength at rupture of 14.5 kg/mm$^2$ and an elongation of 185% as shown afterward in Run No. 2. Generally, when the strength is enhanced by orientation, the film tends to lose its elongation to an extreme extent. In the case of the commercial film which is thoroughly crosslinked (with the insoluble gel content in boiling xylene brought to 67% by weight) and consequently oriented sufficiently as described hereinafter, the strength is 6.9 kg/mm$^2$ and the elongation is 45%, indicating that the film is highly liable to rupture. The film of this invention is not limited to use in shrink wrapping. By virtue of its excellent toughness, it can be utilized widely as an industrial film.

By the after-treatment resorting to heat setting, the temperature for thermal shrinkage and the orientation balance in the longitudinal and lateral directions can freely be adjusted so as to adapt the film of this invention for other uses or enable the film to be laminated with various other films.

Now, a typical process for manufacturing a film for shrink wrapping from the composition of this invention will be described in detail herein below.

This is a process for manufacturing a high-strength oriented film excelling in optical properties and low-temperature shrinkage properties and having a wide range of effective packaging temperatures, which process comprises thoroughly mixing and melting one of the aforementioned combinations of components, i.e. the combinations of (A)+(B), (B)+(C), and (A)+(B)+(C), extruding the resultant homogeneous blend through an annular die, suddenly solidifying the extruded tubular raw film with a liquid refrigerant for thereby producing a tubular raw film sufficiently free from partiality in thickness, causing the tubular sheet, either immediately stretching thereafter or subsequently to a treatment conducted by irradiation of a high-energy ionizing radiant ray with a view to modifying the composition of the tubular raw film so that it acquires an insoluble gel content of not more than about 60% in boiling xylene and a melt index of not more than 1.0, to be heated to a temperature in the range of from normal room temperature to 110° C., and introducing air into the interior of the tubular raw film at a stretching temperature in the range of from 20° C. (room temperature) to 100° C. for thereby effecting cold orientation at an area stretching ratio of from 5 to 30 times the original dimension.

Now, the process of the present invention will be described with reference to the most desirable combination of components. The components of the combination are melted under heat and thoroughly blended. The resultant blend is extruded at an extruding temperature in the range of from 180° C. to 280° C. through a shape die adapted effectively to avoid giving to the extruded sheet uneven wall thickness and imparting thereto heat and time hysteresis, and the extruded tubular raw film is suddenly cooled on the outer periphery thereof uniformly with a liquid refrigerant to produce a tubular raw film of ample homogeneity (in terms of both external shape and internal structure). This tubular sheet is immediately subjected in its unaltered form to the subsequent heat treatment followed by the step of stretching. Alternatively, it is irradiated with a high-energy ionizing radiant ray of 2 to 15 Mrads such as, for example, an electron ray, β-ray or γ-ray radiated from a radioisotope or it is radiated with an ultraviolet ray in the presence of a sensitizer (such as, for example, benzophenone or peroxide) incorporated in advance in the composition for the purpose of modification such that the resultant tubular sheet exhibits an insoluble gel content of not more than about 60% by weight in boiling xylene and a melt index of not more than 1.0. The reason for these particular ranges has already been described. Any deviation from the specified range of energy of the irradiation is undesirable: If the irradiation exceeds 15 Mrads, there ensue undesirable phenomena such as severance of molecules due to decomposition (embrittlement of resin) and coloration and odorization of the resin. If the irradiation falls short of 2 Mrads, the desired effect of irradiation cannot be obtained. From the viewpoint of physical properties and ease of processibility, preferable irradiation is obtained in the range of from 2.5 to 10 Mrads. This modification may otherwise be obtained by a thermal crosslinking method using a peroxide. The tubular raw film thus treated is then heated to a temperature in the range of from normal room temperature to 110° C., preferably not more than 90° C., and more preferably not more than 80° C., i.e. the temperature at which the main crystalline component used in the composition remains undissolved and, at the same time, inflated in the form of a bubble with an ample inner pressure in the range of from 100 to 1000 mm $H_2O$ of water column at a temperature in the range of from room temperature (20° C.) to 100° C., preferably from 30° C. to 90° C., and more preferably from 30° C. to 80° C., i.e. the temperature which is lower than the melting point of the main crystalline component used in the mixed composition, preferably lower than the Vicat softening point of the mixed composition. In this manner, the film of the present invention is obtained advantageously. The optimum area stretching ratio, though variable to some extent with the prevailing temperature at the time of stretching, is desired to fall in the range of from 5 to 30 times the original dimension, preferably from 7 to 30 times the original dimension, and more preferably from 10 to 20 times the original dimension. The lateral stretching ratio is generally desired to fall in the range of from 2 to 7 times the original dimension, preferably from 3 to 6 times the original dimension. For the cold orientation to be obtained effectively without entailing the possibility of film puncture, it is imperative that the composition should fall within the range specified herein and it is equally important that the tubular sheet should enjoy ample uniformity. If the wall thickness of the tubular raw film involves a deviation of 20% or more, there is a fair possibility of the raw film sustaining puncture in the course of stretching, making effective stretching impracticable. The allowable deviation of wall thickness of the tubular raw film is within ±5%, preferably within ±3%. Stable stretching of the tubular raw film into a film is advantageously accomplished by first fixing the longitudinal stretching ratio through adjustment of the ratio of rotating speeds of the feed nip rolls and the takeup nip rolls and thereafter adjusting the introduction of air into the tubular raw film now inflated in the form of a bubble so as to effect the stretching up to the end point of bubble inflation (immediately before the point of blushing) and bring the lateral stretching to termination. Because of the relation between the inner pressure applied to bear on the bubble and the diameter of the bubble, the tubular raw film is desired to have as large a diameter as possible, generally greater than 50 mm, preferably greater than 100 mm. In due consideration of the physical properties of the film to be produced, the stretching temperature is desired to be the lowest level at which the stability of the bubble is retained. For practical purpose, it suffices to determine the degree of stretching on the basis of the composition being used, with due consideration paid to the balance with the bubble stability (enough to preclude possible film puncture). Since the transfer of heat to the film is small, a fact which characterizes the process of the present invention, the thickness of the film can be freely selected from a wide range from a very small order of 5 to 6μ to a very large order of 100 to 150μ. This general choise of the film thickness afforded by the present invention has never been attained with the conventional films.

The film which is obtained by the process of this invention possesses the outstanding properties mentioned above and, more often than not, has a highly limited deviation of film thickness of the order of ±5% after the step of stretching. A possible reason for this advantage is that the high inner pressure applied to bear upon the bubble imparts a strong stretching force to the film and the heat hysteresis generally involved in the course of heating and cooling is notably small and, consequently, the film enjoys high uniformity and stability. The optical properties (both Haze and gloss) of the tubular raw film appear to be quite inferior. They are notably improved, however, after the tubular raw film has undergone the treatment for cold orientation by the process of this invention. A possible reason for this improvement of optical properties may be that the resin particles distributed in the form of islands throughout the sheet are changed in change in consequence of the cold orientation. Since the process of this invention enables the distributed resin particles to be oriented and flattened out, the film no longer causes random scattering of light. It is, accordingly, inferred that the stretching of the film is advantageously attained even at low temperatures to produce a strong film, notwithstanding the composition is a blend not mixed so thoroughly as to induce dispersion of molecules.

In the present invention, the components which make up the composition manifest synergistic effects respectively. When any of the components used in the composition is relied upon to impart added strength to the film, it will neither bring about a drawback often experienced in a similar situation nor cause any degradation of strength. This advantage is never attained by the ordinary stretching method which requires the sheet to be heated up to or over its melting point. In the case of the conventional film, the stretching temperature must be elevated to have the optical properties of the film improved. Use of the elevated stretching temperature renders the desired orientation all the more difficult and tends to degrade the film strength.

The same thing also applies to the use of a stretching temperature which is close to the melting point. At such a stretching temperature, the optical properties of the film obtained are far from being satisfactory and the mixed composition happens to reach the point where the tubular sheet becomes intolerably brittle. Thus, the film sustains puncture and fails to acquire advantageous properties. As illustrated in the preferred embodiments of this invention afterward, the cold orientation aimed at by the present invention can be effectively attained at a very low temperature such as, for example, 32° C. This is an unprecedented achievement, which is not materialized unless the specific composition, the specific treatment with a high-energy ray which is optionally carried out, the uniform quenching of the tubular raw film and the specific conditions of stretching are combined to produce synergistic effects. It goes without saying that the film sustains puncture and cannot be effectively stretched when the quenching given to the tubular raw film lacks uniformity and the film of the present invention can never be obtained when the stretching temperature actually used deviates from the specific range described above. When the stretching of the tubular raw film is carried out simply by the tenter method, the film obtained readily sustains rupture and fails to exhibit the outstanding properties peculiar to the film of this invention. It is ideal to have the tubular film stretched monoaxially or biaxially, more preferably biaxially in a tubular form under the stretching conditions mentioned above.

The characteristic processibility of the film and the characteristic attributes of the film obtained by the present invention are believed to be ascribable to the fact that the components making up the composition possess suitably balanced compatibility, the fact that the components on which the individual properties such as crystallinity, softening point and modulus of elasticity all function independently and the components on which such properties function in good harmony cooperate synergistically to bring about ideal effects and the fact that the effect of the treatment with a high-energy ray also participates in the synergistic function mentioned above. As described in one of the comparative examples afterward, when an attempt was made to stretch a tubular raw film obtained from EVA, the bubble of the raw film punctured before it was sufficiently inflated, making it impossible to continue the biaxial stretching of the raw film at the low temperatures specified herein. U.S. Pat. No. 3,244,680 cites an example wherein a high-molecular EVA copolymer was compression molded into a circular disc and subjecting the circular disc to batch stretching by use of a multiaxial chuck (radial stretcher) at temperatures in the range of from 30° to 60° C. The film obtained by this method can never be obtained by the process of this invention. Thus, this invention differs from the process of said U.S. patent in terms of composition, process and film.

The mixed composition of this invention can be converted effectively into a film by a procedure of closing the free end of the tubular raw film batchwise and stretching the tubular raw film by hand while introducing air into the interior thereof through the other end for thereby allowing the tubular raw film to form a cold-oriented bubble stably in the ambient air maintained at temperatures in the range of from 20° to 40° C. None of the components, when used singly, can form a bubble and can be stretched biaxially even in a continuous operation by the process of this invention.

Figure 5:
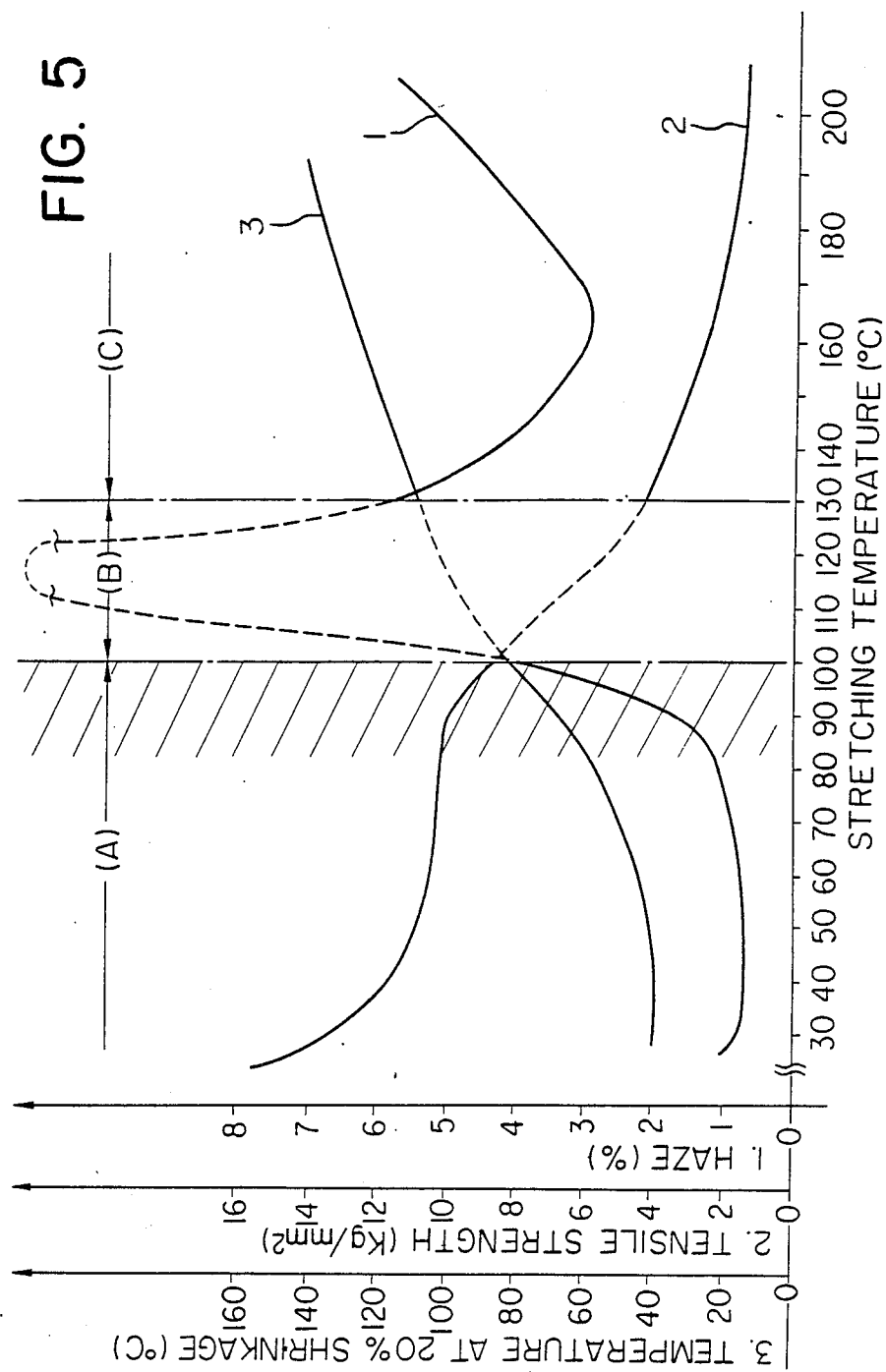
FIG. 5 shows the variation of the characteristic properties of the film of Run No. 1. Example 1 in the stretch-working temperature, the area (A) is the area of the film of the present invention.

FIG. 5 represents the processibility data obtained in Run No. 1 and expressed in terms of characteristic elements. The zone (A) contains the data obtained of the stable processing according to the present invention and the zone (B) those of unstable processing. In the latter zone, the optical properties, strength and film thickness at the time of stretching are heavily degraded. In the zone (C), the molecular flow in the film is so heavy as to impede effective setting of orientation, so that the film strength is lower and the elongation is greater. This trend substantially exists when the tubular raw film is given a treatment for crosslinking. The crosslinking treatment serves to alleviate the decline of strength in the zones (B) and (C) and tends to enhance only slightly the strength in the zone (A). The trend with respect to the optical property (Haze) and the low temperature shrinkability remain unaffected by the crosslinking treatment.

The composition and the process of this invention may be applied effectively to the manufacture of a film by monoaxial stretching. In this case, the properties of the film are attained in the direction of the stretching. Further, the tubular raw film which is obtained by extruding the homogeneous blend of the composition and subsequently quenching the extruded raw film can be used as a film of high strength at rupture and as a composition with improved heat sealability and elastic modulus and good seal strength, because it has been modified so as to be readily cold oriented at normal temperatures and good for stability at inflation. For example, it may be used as a film for general wrapping or as a low-oriented film for stretch wrapping, bag film, etc.

Now, the composition and film of this invention, and the process for the manufacture of this film will be described more specifically hereinafter with reference to preferred embodiments, which are solely illustrative of and never limitative of this invention.

EXAMPLE 1

To 100 weight parts of the composition composed of 82% by weight of EVA ($a_1$) (the vinylacetate unit content 10% by weight, the melt index 1.0) and 18% by weight of the ethylene-α-olefin copolymer ($b_1$) (α-olefin is propylene, said copolymer comprises 15 mol % of propylene and 4% by weight of ethylidine norbornene) having the melt index of 0.45, the Vicat softening point of not more than 40° C. and the density of 0.88 g/cm$^3$, were mixed 18 weight part of the crystalline PP ($c_1$) having the melt index of 1.0, the density of 0.88 g/cm$^3$ and the Vicat softening point of 146° C., and the plasticized kneading composition was extruded at the maximum temperature of the cylinder part of 250° C. from the annular die 150 mm in diameter having the slit of 1.5 mm provided with the mixing head type screw 65 mm in diameter and the ratio (L/D) of 37. Then the extruded product was quenched at the position which was about 10 cm distance from the lip of the die by water which was uniformly flowed out from the ring. Thus, there was obtained the raw tubular film 100 mm in diameter, 200μ in thickness, partiality of ±1.8% in thickness. The said composition had the Vicat softening point of 75° C. The obtained raw tubular film was treated with the electron ray of 500 KV energy in the dose of 5 Mrad at the normal temperature so as to be the gel % of 3% by weight in the boiling xylene and the melt index of 0.07 (Run No. 2), while the said composition was directly proceeded to the following stretching step without radiating the heigh energy ray (Run No. 1).

The raw tubular film was passed between the two pairs of the delivery nip rolls and the draw nip rolls respectively, while passing said rolls, the raw tubular film was heated to the temperature of 36° C. by the hot air and then was continously inflated under the inner pressure of the water head of 400 mm by blowing air within the tubular film and stretched by 3.5 times in the longitudinal direction and 3.3 times of the transverse direction, the cold air of 20° C. was blown to the film from the air ring apparatus at the end of the stretching step to cool the film. The film was fold up by the deflator and then taken up by the nip rolls and separated to the two sheets of film by slitting the edges of the film in the longitudinal direction. Each of which was winded up under the certain tension whereby the films 17μ in thickness (Run No. 1 and No. 2) were obtained. Table 2 showed the characteristic properties of the resulting film in comparison with those of the commercial three sorts of films.

The stretched film obtained (for example Run No. 2) had good optical character of Haze of 0.8% and the superior strengths of the tensile strength of 14.5 kg/cm$^2$, the elongation of 185% and the dart impact strength of 7 kg.cm in comparison with that of 20 kg.cm in the commercial plasticized PVC shrink film (17μ in thickness), 12 kg.cm in the PP shrink film (16μ in thickness). The high dart impact strength was one of the characteristics of the film of the present invention. As shown in Table 1 and FIG. 1, the film had the following low temperature shrinking properties; 53° C. at 20% shrinkage, 72° C. at 40% shrinkage. The curve in FIG. 1 showing the interrelation between the heat-treating temperature (°C.) and the shrinkage (%) displayed the gentle sloping pattern similar to the commercial PVC shrink film. Furthermore, this film had good shrinkage character toward the low temperature side.

Figure 3:
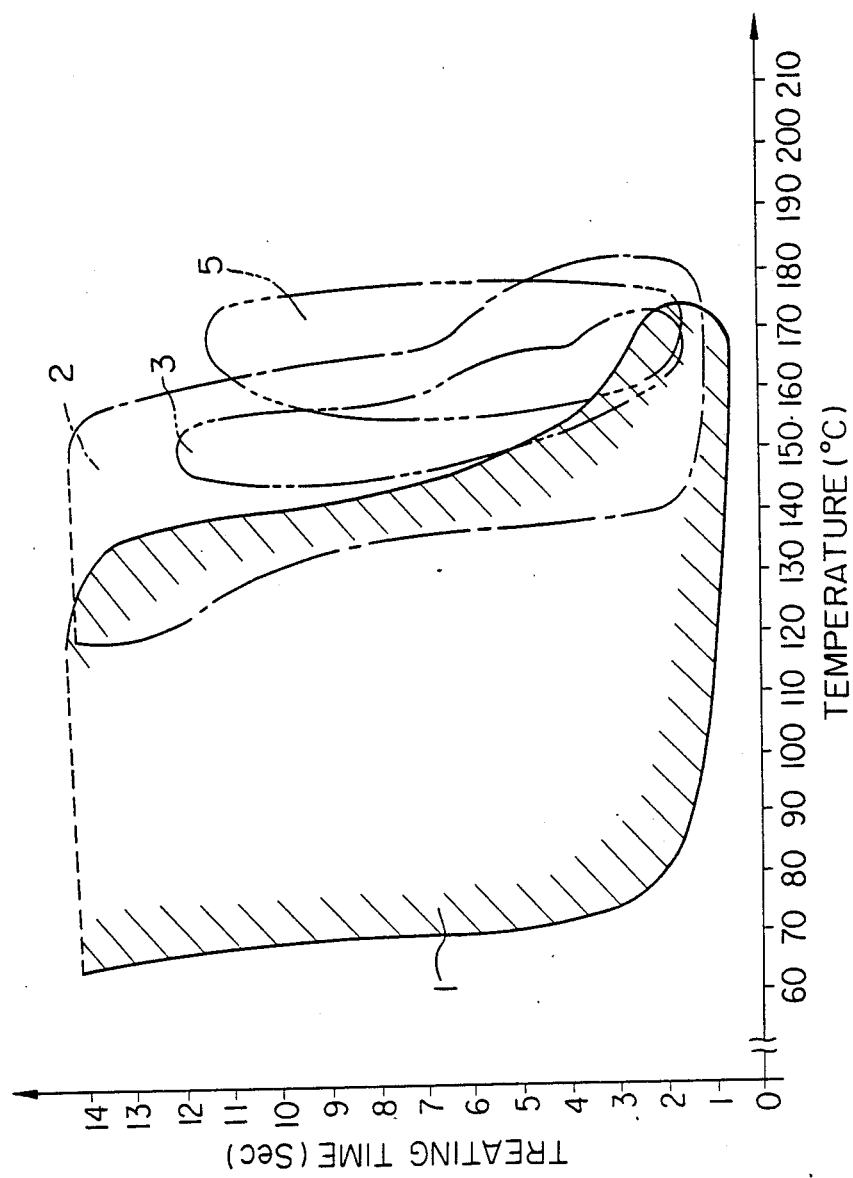
FIG. 3 shows the result of the practical shrink-wrapping test of the various films, namely the range capable of obtaining the good wrapping finish not having a wrinkling, a pockmark and a breakage when four cucumbers were shrink-wrapped.

This film had the maximum shrink tension of 230 g/mm$^2$ which was a high level. In the practical test of wrapping four cucumbers, wrapping was carried out by passing the wrapped film for 3 seconds through the conventional tunnel over which was blown out the hot air of 90° C. thereby obtaining the good wrapping finish tightly fitted with goods and not having any wrinkling and not depressing good optical character after shrinkage. As shown in the oblique portion of FIG. 3. No. 1, the various tests were carried out by changing the hot air temperature when the shrinking wrapping was carried out and the staying time within the tunnel. From the test result, it was found to be able to smoothly carry out good wrapping at the broader range of the heating temperature with the broader speed range from the low temperature side.

While the commercial shrink film of polypropylene did not almost shrink at 90° C. and remained the wrinkle on the sample, the satisfactory shrinking could not be accomplished without the high shrinking temperature of 170° C. Even if the heating temperature was further raised and the staying time was lengthened, the wrapping film was broken due to pitting and became opaque. The optimum shrink temperature range of the film was very narrow. The commercial shrink film of PVC had lack of the shrinkage and remained the wrinkle under the same wrapping condition as mentioned above. Therefore, the shrinking temperature of 150° C. was demanded.

The shrink film of the commercial crosslinked polyethylene was not suitable to the wrapping film since it could not shrink without the high temperature of 170° C., the film was easy to break at the sealed part and moreover, was apt to occur much breakage, the good wrapping range of the film was judged from the shrinkage, the binding force, the hole at the sealing part, the rupture from the air vent part and the devitrification phenomenon of the film after wrapping. Furthermore, judging from the good wrapping finish, the film Run No. 2 of the present invention was the best one. Similar results were obtained in the film Run No.1 of the present invention.

Hereafter, the strength, the elongation and the heat-shrinking property of the film were shown by the mean value between those of the longitudinal and transverse directions since said characters of the film had in the longitudinal and transverse directions in good balance.

TABLE 1

| Shrinking temp. (°C.) | 50 | 60 | 80 | 100 | 120 | 140 | 160 | 180 | 200 |
|---|---|---|---|---|---|---|---|---|---|
| Heat shrinkage (%) Run No. 1/Run No. 2 | 16/17 | 26/27 | 49/47 | 65/63 | 71/70 | 74/74 | 76/77 | 77/78 | 83/80 |

TABLE 2

| Property | Unit | Run No. 1 | Run No. 2 | Comparative sample I | Comparative sample II | Comparative sample III |
|---|---|---|---|---|---|---|
| Hage | % | 1.0 | 0.8 | 1.7 | 2.8 | 2.5 |
| Gloss (20°) | — | 142 | 150 | 123 | 105 | 103 |
| Thermal Property | | | | | | |
| 20% shrinkage temperature | °C. | 53 | 53 | 58 | 120 | 100 |
| Maximum shrinkage | % | 83 | 80 | 58 | 72 | 76 |
| Maximum shrink tension | g/mm$^2$ | 180 | 230 | 108 | 208 | 192 |
| Temperature at peak | °C. | 70 | 69 | 115 | 115 | 102 |

TABLE 2-continued

| Property | Unit | Run No. 1 | Run No. 2 | Comparative sample I | Comparative sample II | Comparative sample III |
| --- | --- | --- | --- | --- | --- | --- |
| Tensile strength at break | kg/mm² | 12.0 | 14.5 | 8.0 | 14.4 | 6.9 |
| Elongation at break | % | 200 | 185 | 145 | 125 | 45 |
| Dart impact strength | kg · cm | 32 | 37 | 20 | 12 | 8.5 |

Note:
Gloss was measured in accordance with ASTMD 2454 - 65T.
I is commercial PVC shrink film.
II is commercial PP shrink film.
III is commercial cross-linked polyethylene shrink film.

The film of the present invention was remarkably good in the range and strength of heat-sealing in comparison with another comparative Run Nos. 1, 2 and 3 when said film was heat-sealed by the heating bar type heat sealing machine.

Figure 4:
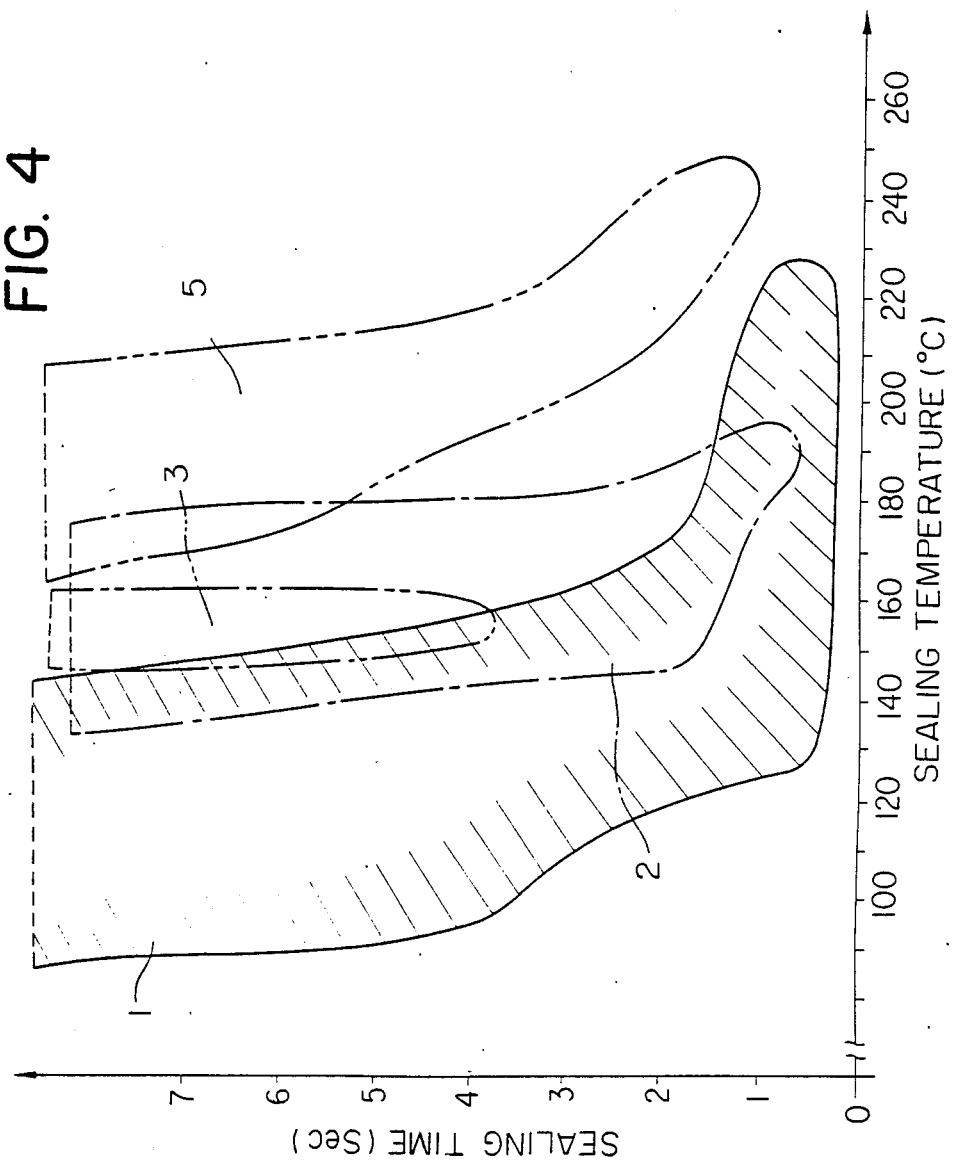
FIG. 4 shows the range capable of obtaining the suitable heat-sealing when the heat-sealing was carried out by the heating bar type sealer.

The extent capable of heat-sealing was that surrounded by the oblique lines of No. 1, FIG. 4. The axis of abscissa showed the temperature of the heat-sealing bar. The lower limit of the temperature was that corresponding to 50% probability between the case of immediately peeling off the film without being sealed and the case of causing breakage of the film from the sealed part when the sealed film was pulled The upper limit of the temperature was that capable of cutting off the film by melting when the film was pressed with the heating bar. Press was carried out under the pressure of 1.3 kg/cm². The sealing strength under the optimum condition was 1.3 and 1.5 kg/15 mm width in Run No. 1, 2 respectively, while said strength was 0.6, 1.1 and 0.7 kg/15 mm width in another comparative examples a, b and c respectively. The film of the present invention had large strength and broad sealing range.

EXAMPLE 2

EVA ($a_2$)(the vinyl acetate group content; 15% by weight, the melt index; 0.7) and ethylene-α-olefin copolymer elastomer ($b_2$) (α-olefin is propylene, and 20 mol % of α-olefin group are contained, the melt index: 0.25, the density: 0.88 g/cm³, and the Vicat softening point: less than 40° C.) and the crystalline PP ($C_2$) (ethylene group content; 5% by weight, the melt index: 0.6, the Vicat softening point: 120° C., the density: 0.87 g/cm³) were mixed in the ratio as mentioned in Table 3 and extruded according to the process of Example 1 to obtain the raw tubular film (150μ in thickness and partiality of ±1.8% in thickness). Then the obtained film was extruded without any cross-linking treatment at the stretching temperatures of 41, 51, 53, 60, 75 and 79° C. in Run Nos. 3-8 respectively thereby being manufactured the stretched films having good stability and 14μ in thickness.

Each of the stretched film had less partiality of ±6–8% in thickness the good stretching workability and dart impact strength of more than 25 Kg.cm.

The physical properties of each film were shown in Table 4.

TABLE 3

| Composition | Run No. 3 | 4 | 5 | 6 | 7 | 8 |
| --- | --- | --- | --- | --- | --- | --- |
| $a_2$ | 90 | 70 | 50 | 80 | 60 | 40 |
| $b_2$ | 10 | 30 | 50 | 20 | 40 | 60 |
| $c_2$ | 10 | 30 | 30 | 70 | 100 | 70 |
| Vicat softening point of the mixed composition (°C.) | 64 | 68 | 62 | 88 | 93 | 84 |

TABLE 4

| Property | Unit | Run No. 3 | 4 | 5 | 6 | 7 | 8 |
| --- | --- | --- | --- | --- | --- | --- | --- |
| Hage | % | 0.8 | 1.0 | 1.1 | 1.2 | 1.3 | 1.3 |
| Thermal property | | | | | | | |
| 20% shrinkage temperature | °C. | 55 | 57 | 59 | 63 | 68 | 60 |
| 40% shrinkage temperature | °C. | 75 | 78 | 75 | 80 | 82 | 79 |
| Maximum shrinkage | % | 80 | 78 | 75 | 74 | 72 | 73 |
| Maximum shrink tension | g/mm² | 220 | 180 | 280 | 175 | 160 | 150 |
| Temperature at peak | °C. | 60 | 68 | 72 | 71 | 80 | 75 |
| Breakage strength | Kg/mm² | 11.5 | 13.7 | 15.0 | 14.0 | 12.9 | 11.6 |
| Elongation at break | % | 180 | 190 | 250 | 220 | 160 | 170 |

As mentioned above, the practical wrapping test of the resulted film was carried out according to the wrapping operation of Example 1. The film had good wrapping finish without occuring any wrinkling on the finishing surface. The film was suitable to various uses with good resdlt in the wrapping. The wrapping test was carried out using the shrink films of Run No. 4, the commercial PP and PVC respectively. The test was carried out by wrapping with the film to be test a king crab which is the representative angulated goods. The test results were as follows: The PP and PVC films caused the breakage by spines of the king crab, while the film of Run No. 4 gave good wrapping finish. The PP and PVC films became brittle during the storage and was apt to cause the breakage since the PP and PVC films were inferior to the low temperature resistance, while the film of No. 4 was no problems in wrapping ability.

EXAMPLE 3

EVA (a$_3$) (the melt index: 0.7, the vinylacetate group content: 13 weight %), ethylene-α-olefin copolymer elastomer (b$_3$) (the melt index: 0.25, the Vicat softening point: less than 50° C., the density: 0.88 g/cm$^3$, α-olefin is butene-1 and α-olefin group content: 20 mol %) and the crystalline PP (C$_2$) (mentioned above) were extruded and stably stretched in the mixing ratio and the conditions as shown in Table 5 according to the process of Example 1 under the stretching temperatures of 32°, 35°, 40°, 51°, 53° and 50° C. which were the temperatures less than the Vicat softening point of the mixed composition in Run Nos. 9–14 respectively whereby the stretched films having 18 μ in thickness were obtained.

Each of the film had less partiality of ±6–8 % in thickness.

The physical properties of the resulted films were shown in Table 6.

TABLE 5

| Composition | Run No. | | | | | |
|---|---|---|---|---|---|---|
| | 9 | 10 | 11 | 12 | 13 | 14 |
| a$_3$ | 90 | 70 | 50 | 80 | 60 | 40 |
| b$_3$ | 10 | 30 | 50 | 20 | 40 | 60 |
| c$_2$ | 10 | 30 | 30 | 70 | 100 | 70 |
| Dose (Mrad) | 3 | 5 | 10 | 7.5 | 7.5 | 5 |
| Gel (%) | 1.5 | 2.5 | 20 | 12 | 8 | 1.0 |
| MI | 0.1 | 0.07 | less than 0.05 | 0.08 | 0.09 | 0.15 |

Note: Unit is based on the weight part.

TABLE 6

| Property | Unit | Run No. | | | | | |
|---|---|---|---|---|---|---|---|
| | | 9 | 10 | 11 | 12 | 14 | 14 |
| Haze | % | 0.6 | 0.6 | 1.0 | 1.2 | 1.5 | 1.1 |
| Gloss (20°) | — | 157 | 155 | 153 | 147 | 138 | 150 |
| Thermal property | | | | | | | |
| 20% shrinkage temperature | °C. | 50 | 51 | 52 | 53 | 57 | 54 |
| Maximum shrinkage | % | 77 | 76 | 77 | 78 | 82 | 79 |
| Maximum shrink tension | g/mm$^2$ | 240 | 230 | 220 | 215 | 200 | 205 |
| Temperature at peak | °C. | 60 | 64 | 65 | 72 | 75 | 70 |
| Tensile strength at break | Kg/mm$^2$ | 12.8 | 13.9 | 15.9 | 16.0 | 13.5 | 13.5 |
| Elongation at break | % | 250 | 230 | 210 | 255 | 195 | 220 |
| Dart impact strength | Kg · cm | 38 | 35 | 32 | 40 | 32 | 30 |

As mentioned above, the practical wrapping test was carried out using the said films according to the wrapping operation of Example 1. The good wrapping finish without causing any wrinking on the finishing surface was obtained in all tests.

EXAMPLE 4

The raw tubular films 200 μ in thickness and partiality of ±2.0 % in thickness were manufactured using the polymer composition, the ratio as shown in Table 7. according to the process of Example 1. The resulted raw tubular films were stretched under the stretching temperatures of 42°, 51°, 48°, 66°, 49°, 35° and 70° C. which was less than the Vicat softening point of each film of Run Nos. 15–21, and stably stretched respectively thereby obtaining the films having 17 μ in thickness.

The characteristic properties of this films showed in Table 8.

In order to test the bubble stretching stability by batch method, test pieces were cut out from the raw tubular films of Run Nos. 15–21 before the films were stretched and sealed at one end of the film while the compressed air was blown in the tubular film from another end thereof, and then the test piece was pulled by hand at the temperature of 30° C. The films of the present invention had the good stability and could be bubbled up, especially the test films of Run Nos. 17 and 20 were easy to stretch.

The films had good properties of the optical character, the low temperature shrinkage and the heat shrink tension The breaking strength of a commercial polyethylene film which was directly inflated from the die was only about 2.5 Kg/mm$^2$, while the film of the present invention was the strong film difficult to break, since it had the moderate degree of elongation. Especially the wrapping films of Run Nos. 16 and 18 had high dart impact strength and toughness and were superior in the wrapping test and the heat-sealing property.

TABLE 7

| No. | | Run No. | | | | | | | | (weight part) |
|---|---|---|---|---|---|---|---|---|---|---|
| | | 15 | 16 | 17 | 18 | 19 | 20 | 21 | 22 | 23 |
| a$_2$ | EVA | | | | | 80 | 75 | 80 | | 80 |
| a$_3$ | EVA | 80 | | | 60 | | | | | |
| a$_4$ | EVA (Melt index: 1.5, vinylacetate group content: 20% by weight) | | 70 | 80 | | | | | | |
| b$_3$ | Ethylene-α-olefin elastomer | 20 | 30 | 20 | 40 | 20 | 25 | | 80 | 20 |
| b$_4$ | Ethylene-α-olefin copolymer (EPM) (α-olefin is propylene, α-olefin group content: 42 mol %, density: 0.87 g/cm$^3$, Vicat softening point: less than 30° C.) | | | | | | | 20 | | |

TABLE 7-continued

| No. | | 15 | 16 | 17 | 18 | 19 | 20 | 21 | 22 | 23 |
|---|---|---|---|---|---|---|---|---|---|---|
| | | \multicolumn{9}{c}{Run No. (weight part)} | | | | | | | | | |
| $c_3$ | Crystalline PP (Melt index: 0.8, ethylene group content: 6% by weight) | 18 | | 30 | | 10 | | 25 | 20 | |
| $c_4$ | HDPE (Melt index: 0.8, density: 0.960 g/cm$^3$, modified buten-1 group content: 0.6 mol %) | | 20 | | 60 | | | | | |
| $c_5$ | Polybutene-1 (Melt index: 0.4, density: 0.913 g/cm$^3$) | | | | | | 30 | | | |
| $c_6$ | Polybutene-1 (Melt index: 1.0, density: 0.908 g/cm$^3$, modified ethylene group content: 8% by weight) | | | | | | 70 | | | |
| | Dose (Mrad) | 5 | 7 | — | 10 | — | 5 | — | — | — |
| | Gel % | 4 | 23 | — | 24 | — | 5 | — | — | — |
| | MI | 0.08 | less than 0.05 | — | less than 0.05 | — | 0.09 | — | — | — |

TABLE 8

| Property | Unit | 15 | 16 | 17 | 18 | 19 | 20 | 21 | 22 | 23 |
|---|---|---|---|---|---|---|---|---|---|---|
| Haze | % | 0.6 | 0.5 | 0.9 | 0.8 | 0.6 | 0.7 | 1.2 | 1.5 | 1.0 |
| Gloss (20°) | ~ | 157 | 162 | 143 | 150 | 155 | 149 | 138 | 140 | 160 |
| Thermal Property | | | | | | | | | | |
| Temperature at 20% shrinkage | °C. | 52 | 55 | 56 | 60 | 57 | 61 | 59 | 59 | 56 |
| Maximum shrinkage | % | 78 | 78 | 76 | 74 | 72 | 75 | 74 | 74 | 76 |
| Maximum shrink tension | g/mm$^2$ | 230 | 240 | 220 | 230 | 185 | 160 | 190 | 140 | 150 |
| Temperature at peak | °C. | 62 | 75 | 68 | 77 | 70 | 72 | 70 | 69 | 70 |
| Tensile strength at break | Kg/mm$^2$ | 13.6 | 18.3 | 12.8 | 16.7 | 16.8 | 15.2 | 10.2 | 9.5 | 14.8 |
| Elongation at break | % | 230 | 195 | 197 | 210 | 170 | 165 | 185 | 185 | 175 |
| Dart impact strength | Kg · cm | 36 | 48 | 35 | 43 | 31 | 32 | 26 | 25 | 34 |

EXAMPLE 5

The raw tubular film 150 mm in diameter, 500 μ in thickness and partiality of ±1.5% in thickness was extruded using the composition and condition of Run No. 4 Example 2 and stretched at 50° C. to obtain the uniform film 45 μ in thickness. Even if the thickness of the finished film was thick, the stretch was stably accomplished. The characteristic property of the film was the Haze of 1.0%, the tensile strength at break of 13.5 Kg/mm$^2$, and the elongation of 185%. The film was superior in the optical character and the strength and had the temperature of 60° C. at 20% shrinkage and the maximum shrink tension of 230 g/mm$^2$, until now, as mentioned above, the directly blown LDPE film had been used in the thicker shrink film in the market (curve 4 in FIGS. 1 and 2). The film had less heat shrinkage at the low temperature side and the relative high shrinking temperature. The film had high shrinking temperature of 117° C. at 20% shrinkage and exceedingly low shrink tension of 5 g/mm$^2$ whereby the use was very limited. The thick film was the useful one in the industrial application.

In the practical test of wrapping the wood, as the result, the speedy shrink-wrapping could be accomplished with the fine wrapping finish having no wrinkling, while the uncrosslinked low density commercial polyethylene film was required higher temperature and longer time for the heat-shrinkage and created the wrinklings on the surface of the wrapping film and the partial devitrification of the film. The unsatisfactory result was obtained. If the temperature was raised to accelerate the wrapping, the temperature reached to the melting point of the film before the film was uniformly and sufficiently heated thereby dissolving the most part of the film and transferring heat to the goods.

When the film of the present invention was stabilized by heat-treating at the desired temperature and heat-setting, the film having the good dimensional stability was obtained at the relatively high temperature of for example about 80° C. This shrinking film was not only limited to the specific use but also be applicable for the generic wrapping, the agricultural and the industrial uses.

EXAMPLE 6

Seventy weight parts of LDPE ($a_5$) (the melt index; 0.3, the density; 0.917 g/cm$^3$), 30 weight parts of ethylene-α-olefine copolymer ($b_1$) (referred to above) and 15 weight parts of the crystalline PP ($c_1$) were extruded according to the process of the Example 1 to obtain the raw tubular film (Run No. 24). As this film was apt to break in stretching, the film was cross-linked by radiating the high energy ray of 10 Mrad so as to have the melt index of less than 0.05 and contain about 40% by weight of gel and then stretched at the stretching temperature of 65° C. thereby obtaining the film 16 μ in thickness. This film had the following properties; Haze; 1.8 %, Temperature at 20 % shrinkage; 70° C., Heat shrink tension; 210 g/mm$^2$, Tensile strength; 8.5 Kg/mm$^2$, Elongation: 155%; D a r t impact strength: 22 Kg.cm.

EXAMPLE 7

The stable stretching was carried out under the same condition to those of Run No. 2, Example 1, using the ethylene-ethyl acrylate copolymer ($a_6$) (the ethyl acrylate unit content: 10 weight %, the melt index: 2.5) (Run No. 25) or the ethylene-metyl methacrylate copolymer ($a_7$) (the methyl methaacrylate unit content: 15 weight %, the melt index: 2.0) (Run No. 26) instead of EVA (Run No. 2). This films had the following properties respectively: Haze; 1.4% 1.7%. Tensile strength: 8.9 Kg/mm², 9.8 Kg/mm². Elongation: 200%, 180%, Dart impact strength 26 Kg.cm, Temperature at 20% shrinkage; 60° C., 65° C., Shrink tension: 140 g/mm², 165 g/mm². The gel % was 12, 15 weight % by radiating the high energy ray of 7.5 Mrad.

COMPARATIVE EXAMPLE 1

The raw tubular films having the compositions of Table 9 were extruded from the die and quenched to obtain the extruded film 100 mm in diameter, 200 $\mu$ in thickness and partiality of ±1.8% in thickness. The said film was stretched under the same processing conditions as those of Example 1.

TABLE 9

| Composition | Comparative example Run No. | | | | | | | | | |
|---|---|---|---|---|---|---|---|---|---|---|
| | 1 | 2 | 3 | 4 | 5 | 6 | 7 | 8 | 9 | 10 |
| $a_2$ | 100 | | | | | | | 80 | | |
| $a_3$ | | 100 | | | | | | | | |
| $b_2$ | | | | | | | 100 | | 20 | 20 |
| $c_1$ | | | 100 | | | | | 20 | 70 | |
| $c_3$ | | | | 100 | | | | | | 70 |
| $c_4$ | | | | | 100 | | | | | |
| $c_5$ | | | | | | 100 | | | | |

Note: Unit is based on the weight part.

The films of the comparative sample Run Nos. 1 and 2 could not be continuously stretched at all under the temperatures of 40° C., 50° C., 60° C., 70° C., 80° C. and 90° C. respectively and were caused breakage when air was blown in the tube. The batch test of this film could not be carried out. These raw films were difficult to continuously stretch without heating the films at the temperature of more than 140° C. These films had Haze of 4.1% and 5.1%, the breaking strength of 2.5 and 2.8 Kg/cm², the elongation of 580% and 450% respectively. These films had not the low temperature shrinkage, and the shrink tension was almost null. These raw films were similar one with the film manufactured from the die by direct inflation and inflating while cooling by air. These raw films contained the gel of 38, 21% by weight respectively when they were radiated with the energy ray (hereinafter it is called E treatment for short). These films had a similar tendency with the above example.

The raw film having the composition of Comparative Example Run No. 3 could not be inflated like the bubble at all since it was caused breakage at the temperature not more than 140° C. This raw film could not be stretched in the continuous or batch process. This raw film was different from that of the present invention. This raw film was somewhat inflated at the temperature more than 140° C. and it was apt to cause breakage immediately after the inflation. This film had the bad transparence having Haze of 5.2% and could not carry out the low temperature shrinkage. This film did not contain the gel even if the E-treatment was carried out. The film was almost the same to the film that the E-treatment was not carried out.

The raw film having the composition of Comparative Example Run No. 4 had lower stretching temperature than that of Comparative Example Run No. 3. This film had the exceedingly unstable stretching character and could not carry out the low temperature shrinkage and was inferior in the strength and had Haze of 4.7% and the temperature of 117° C. at 20% shrinkage.

The raw film having the composition of Comparative Example Run No. 5 could not be inflated at all at the temperature of not more than the melting point (135° C.) and was caused breakage in the continuous or batch process. The film which was inflated at the higher temperature of 150° C. in the same manner to the conventional direct inflation process could not be highly oriented and has the bad optical character. This film was opaque and had Haze of 20%.

The film having the composition of Comarative Example Run No. 6 had high Haze and was opaque as the film of Comparative Example Run No. 5.

The film having the composition of Comparative Example Run No. 7 had elasticity as rubber. This raw film was somewhat inflated at the low temperature of not more than 90° C. However it was caused breakage and shrinkage of bubble. The satisfactory film could not be obtained. As the raw tubular film occurred blocking at the high temperature of about 140° C., the said film could not be stretched at the high temperature.

The raw films having the compositions cf Comparative Example Run Nos. 8, 9 and 10 were caused breakage and could not form the film at low temperatures even if the batch and continuous processes were carried out. At high temperatures of the melting point of the crystalline PP (165° C.) ($c_1$) or at the temperature somewhat less than the said temperature, namely the temperatures of 140° C. (Comparative Example Run No. 9) and 133° C. (Comparative Example Run No. 10), the films were unstable and caused breakage immediately after the inflation. However the films could be hardly stretched. These films had Haze of 4.6% and 3.9%, the temperature of 109° C. and 104° C. at 20% shrinkage respectively and had not the low shrinkage temperature as the raw film carried out the E-treatment of Example 1. The tensile strength at break was 5.1 Kg/mm² and 6.2 Kg/mm² respectively and it was not so high level.

The film of the Comparative Example 1, Run No. 11 having the composition composed of 70 weight parts of the crystalline PP ($c_1$) and 30 weight parts of LDPE (the melt index; 1.5, the density; 0.918 g/cm³) was instable at the temperature of 140-60° C. near to the melting point (165° C.) of the crystalline PP and had high Haze of 5.6%. Of course, this raw film had the low oriented film not having the low temperature shrinkage and having the rough surface of Haze of 18.6% at the temperature of not less than 165° C. This film could not be inflated at the temperature of not more than 140° C. since the bubble was caused breakage.

The raw film of Comparative Example Run No. 12 composed of 80 weight parts of the crystalline PP ($c_1$), 10 weight parts of LDPE (the melt index: 1.5, the density: 0.918 g/cm$^3$) and 10 weight parts of the ethylene-α-olefin copolymer elastomer ($b_2$) was unsatisfactory as in Comparative Example Run No. 11.

COMPARATIVE EXAMPLE 2

Two raw tubular films as in Example 1 were heated to 115° C. and 150° C. respectively and then stretched, one of which was the film 200 μ in thickness manufactured according to the composition and the process of Example 1 without the E-treatment, another of which was the film 200 μ in thickness manufactured according to the composition and process of Example 1 with the E-treatment. The satisfactory stretched film could not be manufactured from these raw films, since said film was brittle and was caused breakage when the stretching was carried out at 115° C. by blowing the compressed air within the raw tubular film. This film was whitish and opaque in appearance. While the satisfactory stretching could be accomplished at 150° C. and these raw films were inflated to 3 times in the vertical direction and 4.4 times in the lateral direction. The resulted films had the following properties respectively: Haze 3.8%, 3.6%. Temperature at 20% shrinkage: 107° C., 106° C., Shrink tension: 3, 10 g/mm$^2$, Breaking strength: 2.9 Kg/mm, 3.5 Kg/mm2 Elongation: 520%, 480%. The film 2.9 Kg/mm had not the low temperature shrinking property and had the bad optical character and the low breaking strength and the shrink tension of almost null. The said films were different from the film of the present invention in the use.

These raw tubular films were caused breakage when the film were stretched to 6 times in the vertical direction only at 60° C. and the stretching elongation was returned. The film had the bad optical character and was lack of uniformity. The raw tubular film was cut off and heated at the temperature of 40°-90° C. and heated at the temperature of 40°-90° C. and stretched to 2 times in the vertical and lateral directions by the tenter for the biaxial stretching use. The stretched film was lack of uniformity in thickness and caused breakage. Thus this film could not be satisfactorily stretched. This film was brittle and easily broken at the temperature of about 100°-110° C. There was merely obtained the film having the bad optical character (Haze: 11.5%} at the temperature of 0° C.

COMPARATIVE EXAMPLE 3

Two raw tubular films containing the gel of 62% and 5% respectively were manufactured from LDPE (the melt index: 1.5, the density: 0.918 g/cm$^3$) only and EVA ($a_1$) only by radiating the energy ray of 15 Mrad according to the process of Example 1. The resulted raw films were heated to the temperature of 150° C. and then stretched to 4.0 times in the vertical direction and 6.0 times in the lateral direction to obtain the film 16 μ in thickness. These films had the following properties respectively Haze: 2.5%, 2.1%. Temperature at 2% shrinkage: 97° C., 87° C. Shrink tension: 115 g/mm$^2$, 95 g/mm$^2$ Tensile strength at breakage: 6.2 Kg/mm$^2$, 115 g/mm$^2$, 8.3 Kg/mm$^2$ Elongation: 80%, 95%. Dart impact strength: 7.2 Kg.cm, 10.3 Kg.cm.

These films were difficult to be heat-sealed and the temperature range for heat-sealing was narrow and the high temperature side and were difficult to melt-cut with a heating wire at the time of wrapping.

EXAMPLE 8

The compositions composed of the components as shown in Table 10 except Run No. 31 were plasticized and kneaded at the maximum temperature of cylinder part of 260° C. by the mixing head type screw 45 mm in diameter (L/D=44) and pelletized to form pellet. The composition of Run No. 31, Table 10 was manufactured by kneading PP ($c^2$) and EPM ($b^4$) into Banbury mixer to make the master batch pellet and diluting the resultant with other components ($a_1$). The compositions were extruded through an extruder 45 mm in diameter (L/D-37) fitted with T-type die which had a slit 1 mm in thickness and 40 cm in width, while extruding a liquid additive was injected into the rear part of cylinder under pressure. The melted polymer compositions extruded from the die were introduced into water to form raw tubular films 100 μ in thickness. One of the resulted films was treated with the radiation of energy ray and the other was treated. They were examined for comparison. The results were shown in Table 11.

TABLE 10

| Composition | Run No. 27 | 28 | 29 | 30 | 31 |
|---|---|---|---|---|---|
| $a_1$ | 85 | 85 | c | 80 | 85 |
| $b_4$ | | | | | 15 |
| $b_1$ | 15 | 15 | | 20 | |
| $b_2$ | | | 80 | | |
| $c_1$ | | | 20 | | |
| $c_2$ | 20 | | | 80 | 20 |
| Dose (Mrad) | — | 7 | — | 10 | 5 |
| Gel % | — | 33 | — | 8 | 20 |
| MI | | less than 0.05 | | 0.07 | less than 0.05 |

The films had tensile strength, impact strength, heat sealing strength and tear strength in high level. The films had wide temperature aptitude for heat-sealing and good sealing strength. Especially, the film of Run No. 30, Table 10 was treated by radiating energy ray of 10 Mrad. However, the film had wide temperature aptitude for sealing and good sealing strength. The films of No. 27, No. 30, Table 10 had good stifness and were superior as the wrapping film.

TABLE 11

| Property | Run No. 27 | 28 | 29 | 30 | 31 |
|---|---|---|---|---|---|
| Haze (%) | 1.8 | 1.5 | 1.6 | 2.5 | 2.2 |
| Tensile strength at break (Kg/mm$^2$) | 3.5 | 3.3 | 3.0 | 3.8 | 3.4 |
| Elongation (%) | 820 | 840 | 730 | 670 | 700 |
| Dart impact strength (Kg · cm) | 73 | 64 | 54 | 80 | 66 |
| Heat sealing strength (Kg/15 mm width) | 2.1 | 1.8 | 1.5 | 2.3 | 1.7 |

EXAMPLE 9

The compositions of Run No. 27, Table 10 and the vinylidene chloride-vinylchloride copolymer (hereinafter referred to as PVDC) were extruded using an annular die having three layer structures with three extruders and then inflated by the water cooling type inflation process to obtain co-extrusion film composed of a film of the composition Run No. 27, 25 μ in thickness as the outer layer, a film of the composition Run No. 27, 30 μ in thickness as the inner layer and a film of the composition PVDC 10 μ in thickness as the middle layer. The film has the following properties: Haze —2.1%, Tensile strength at break—5.1 (kg/mm$^2$), Elongation —460 (%), Dart impart strength—78 (Kg.cm), Heat-sealing strength—2.2 (Kg/15mm width). The inflation process could be carried out very stably and had a less problem. On the other hand, when (a$_1$) alone was used instead of the composition of Run No. 27 for the outer and inner layers, the film prepared of Run No. 27 for the outer and inner layers, the film prepared suffered surging and so the inflation process was instable.

What is claimed is:

1. A composition suitable to make a cold drawn film comprsing a homogenous blend of one of the specific combinations of components, namely the combinations of (A)+(B)+(C); wherein
    (A) is low-density polyethylene,
    (B) is an elastomer having a density of not more than 0.91 g/cm$^3$ and made of an ethylene-°-olefin compolymer, and
    (C) is a mixture of crystalline polypropylene and crystalline polybutene-1 and the ratios of the components are such as to statisy $0.07 \leq B/(A+B) \leq 0.07$ and $0.07 \leq C/(A+B) \leq 0.8$.

2. The composition according to claim 1, wherein the ethylene-α-olefin copolymer as the component (B) has an ethylene group content of not more than 90 mol % and not less than 20 mol %.

3. The composition according to claim 1, wherein the ethylene-α-olefin copolymer as the component (B) has an ethylene group content of not more than 90 mol % and not less than 40 mol %.

4. The composition according to claim 1, wherein the elastomer as the component (B) is a non-rigid copolymer having a Vicat softening point of not more than 80° C. and a degree of crystallization of not more than 30%, wherein the α-olefin component contained therein is at least one member selected from the group consisting of α-olefin having from 3 to 12 carbon atoms.

5. The composition according to claim 1, wherein the component (B) is a thermoplastic elastomer random copolymer wherein the α-olefin component contained therein is selected from the group consisting of propylene and butene-1, and the coolymer possesses a melt index of from 0.1 to 10.

6. The composition according to claim 1, wherein the hylene-α-olefin copolymer as the component (B) has a polyene copolymerized in addition to the main mponents of ethylene and α-olefin 7. The composition according to claim 6, wherein the polyene contains not more than 5 mol % of a non-conjugate diene selected from the group consisting of hexadiene and norbornene derivatives.

8. The composition according to claim 1, wherein the component (C) is a rigid polymer having a Vicat softening point of not less than 100° C.

* * * * *